(12) United States Patent
Nishimura et al.

(10) Patent No.: US 6,873,788 B1
(45) Date of Patent: Mar. 29, 2005

(54) DISK RECORDING AND/OR REPRODUCING APPARATUS

(75) Inventors: Hajime Nishimura, Kanagawa (JP); Seigo Fukushima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/521,698

(22) Filed: Mar. 9, 2000

(30) Foreign Application Priority Data

Mar. 11, 1999 (JP) .......................... P11-064217
Jun. 7, 1999 (JP) .......................... P11-158903

(51) Int. Cl.[7] .............. H04N 5/85; H04N 7/64
(52) U.S. Cl. .............. 386/125; 386/124; 386/113
(58) Field of Search ............... 386/46, 95, 98, 386/111, 112, 125, 116, 124, 105, 106, 109, 27, 33, 45, 40, 113, 21; H04N 5/85, 7/64

(56) References Cited

U.S. PATENT DOCUMENTS 5,740,435 A * 4/1998 Yamamoto et al. ......... 707/205
5,774,431 A 6/1998 Bos et al.
5,809,206 A * 9/1998 Seki ........................... 386/116

FOREIGN PATENT DOCUMENTS

JP 09-153250 * 6/1997

OTHER PUBLICATIONS

Patent Abstracts of Japan vol. 1998, No. 10, Aug. 31, 1998 & JP 10 134479 A (Ricoh Co Ltd), May 22, 1998.
Patent Abstracts of Japan vol. 1996, No. 07, Jul. 31, 1996 & JP 08 077749 A (Yamaha Corp), Mar. 22, 1996.
"Distrubances in Electrical Power/Effects on and Protection of Computer Equipment" UCC DDD Letter, Online! Aug. 5, 1997, XP002207540 University of Connecticut Computer Center Website Retrieved from the Internet: <URL:http://{www.ucc.uconn.edu/wwwucc/ddd00063.html> retrieved on Jul. 25, 2002!.

* cited by examiner

*Primary Examiner*—Robert Chevalier
(74) *Attorney, Agent, or Firm*—Frommer Lawrence & Haug LLP; William S. Frommer

(57) ABSTRACT

At least address information that is necessary for access of an input data recording area of a disk-shaped recording medium is recorded in a nonvolatile memory.

7 Claims, 10 Drawing Sheets

FIG. 3

| 8 BYTES | 3 BYTES | 1 BYTE | 10 BYTES | 2 BYTES | 2 BYTES | 2 BYTES | 4 BYTES |
|---------|---------|--------|----------|---------|---------|---------|---------|
| NAME | EXTENSION | ATTRIBUTE | RESERVE | RECORDING TIME | RECORDING DATE | HEAD CLUSTER NUMBER | FILE LENGTH |

FIG. 4

| FAT VALUE (HEXADECIMAL) | MEANING |
|---|---|
| 0000h | CORRESPONDING CLUSTER IS FREE |
| 0002h ~ FFF6h | CORRESPONDING CLUSTER IS DATA-ASSIGNED INDICATES IMMEDIATELY FOLLOWING CLUSTER NUMBER |
| FFF7h | INDICATES DEFECTIVE CLUSTER |
| FFF8h ~ FFFFh | CORRESPONDING CLUSTER IS DATA-ASSIGNED INDICATE FILE END (EOF) |

# DISK RECORDING AND/OR REPRODUCING APPARATUS

BACKGROUND OF THE INVENTION

1. Field of the Invention

The present invention relates to a disk apparatus and can be applied to, for example, a removable hard disk apparatus for recording a video signal. It is intended to make it possible to access a data area with a short waiting time and use, as effective data, so far recorded data even at the occurrence of an abnormal termination, by storing, in a nonvolatile memory, at least address information that is necessary for access of an input data recording area of a disk-shaped-recording medium.

2. Description of the Related Art

Conventionally, among apparatuses for recording a video signal, video tape recorders using a magnetic tape as a recording medium are widely used. In such video tape recorders, a video signal and an audio signal that are input in time series are helically recorded on a magnetic tape in units of the field or frame of the video signal.

In recent years, apparatuses for recording a video signal and an audio signal using an optical disc have been proposed. Such apparatuses using an optical disc can record a video signal and an audio signal of about 2 hours.

In contrast, personal computers record application programs etc. by using a hard disk drive. In recent years, hard disk drives have been miniaturized and increased in recording density at high speeds.

In such hard disk drives, the recording area of hard disks is divided into a system entry area and a data area. Various data that are input from external apparatuses are recorded in the data area and data that are necessary for access of the data area are recorded in the system entry area.

Therefore, in hard disk drives, the contents of the system entry area are updated upon completion of data recording in the data area. This makes it possible to access recorded data by searching the system entry area and to record desired data by detecting a free region by searching the system entry area.

Incidentally, it is considered that a compact recording apparatus capable of long-time recording of a video signal could be constructed by using a hard disk drive. In this case, it is conceivable to deal with, as files, a video signal and an audio signal to be recorded in the hard disk drive and to use, as it is, a file management system that is used in personal computers.

However, where a video signal etc. are recorded simply by using a file management system that is applied to personal computers etc., there are problems that the waiting time until access of the data area is long and that it is difficult to cope with an abnormal termination of recording.

Specifically, in hard disk drives, in recording or reproduction, it is necessary to access the system entry area in advance because the data area is accessed based on data recorded in the system entry area. Hard disk drives have a problem that a long waiting time is needed until the start of access to the data area because considerable time is required for magnetic head seeking and hard disk rotation waiting in accessing the system entry area.

As for the above problem, in applying a hard disk drive to a personal computer, adverse influences of such a long waiting time can be avoided by performing a data exchange in such a manner that the personal computer side is rendered in a standby state by means of an interface between the hard disk drive and the personal computer. However, in the case of dealing with a video signal, it is necessary to record or reproduce high-transfer-rate data on a real-time basis. If the waiting time is long, there may occur an event that continuous data cannot be recorded in a case where a hard disk drive is applied to a video-camera-incorporated recording apparatus, for example.

In hard disk drives, repeated recording and erasing operations cause continuous data to be recorded in discrete regions (divided regions), as a result of which a video signal may not be produced continuously in reproduction.

On the other hand, in applying a hard disk drive to, for example, a video-camera-incorporated recording apparatus, consideration should be given to the fact that the power may be shut off during recording due to a drop, running out of electricity of a battery, a sudden power shutoff by a user, or the like. In conventional hard disk drives, it is difficult to update the contents of the system entry area at the occurrence of such an abnormal termination; a video signal that has been recorded so far with much effort cannot be used anymore.

SUMMARY OF THE INVENTION

The present invention has been made in view of the above circumstances in the art, and an object of the invention is therefore to provide a disk apparatus which makes it possible to access a data area with a short waiting time and to use, as effective data, so far recorded data even at the occurrence of an abnormal termination.

To attain the above object, a disk apparatus according to the invention comprises a nonvolatile memory in which at least address information that is necessary for access of an input data recording area of a disk-shaped recording medium is to be recorded, and memory control means for recording the address information in the nonvolatile memory.

According to the invention, since the disk apparatus comprises the nonvolatile memory in which at least address information that is necessary for access of an input data recording area of a disk-shaped recording medium is to be recorded and the memory control means for recording the address information in the nonvolatile memory, the disk-shaped recording medium can be accessed based on the address information that is recorded in the nonvolatile memory without the need for accessing the disk-shaped recording medium each time. This makes it possible to access the disk-shaped recording medium with a so much shorter waiting time. Even at the occurrence of a power shutoff or the like, data that was recorded until the abnormal termination can be used based on the address information recorded in the nonvolatile memory because the address information is held in the nonvolatile memory even after such an incident.

BRIEF DESCRIPTION OF THE DRAWINGS

FIG. 3 shows file management data that is recorded in a directory area shown in FIG. 2;

FIG. 4 shows codes that are recorded in an FAT area shown in FIG. 2;

DETAILED DESCRIPTION OF THE PREFERRED EMBODIMENTS

Embodiments of the present invention will be hereinafter described in detail with reference to the accompanying drawings.

(1) First Embodiment
(1-1) Configuration of First Embodiment

Figure 1:
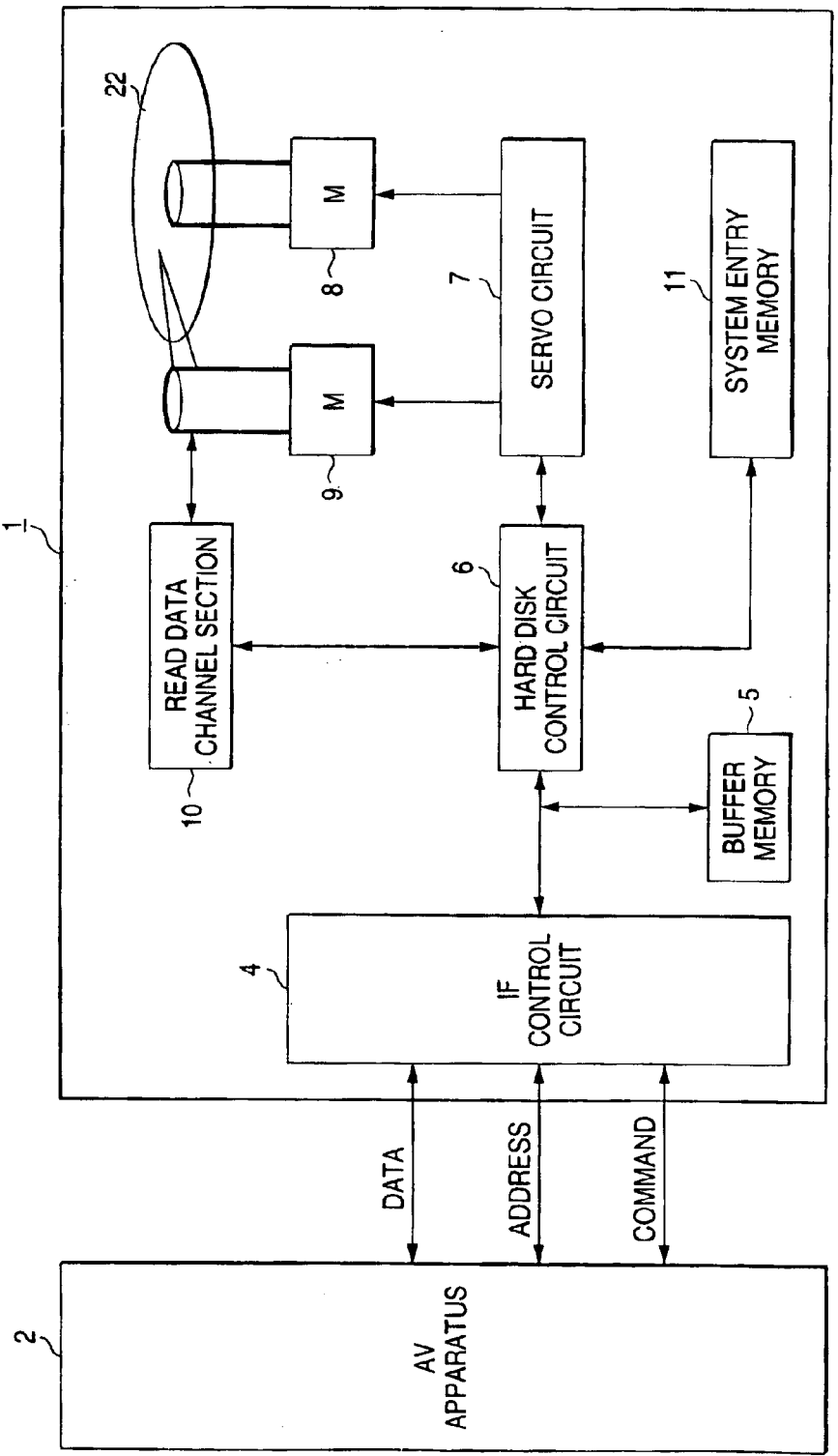
FIG. 1 is a block diagram showing the entire configuration of a hard disk apparatus according to a first embodiment of the invention.

FIG. 1 is a block diagram showing a hard disk apparatus according to a first embodiment of the invention. Attached to an imaging apparatus, a set-top box, or the like, the hard disk apparatus 1 records a video signal and an audio signal that are output from such an AV apparatus. Further, the hard disk apparatus 1 reproduces and outputs a recorded video signal and an audio signal in a state that the hard disk apparatus 1 is attached to the imaging apparatus, set-top box, or the like or removed from it and attached to another AV apparatus.

That is, the hard disk apparatus 1 is detachably held by an AV apparatus 2 such as an imaging apparatus or a set-top box, and inputs to and receives from the AV apparatus 2 data (hereinafter called AV data) obtained by compressing video data and audio data according to a prescribed format as well as control commands, status data, addresses, etc. that are associated with input/output of such AV data. Further, the hard disk apparatus 1 records such AV data on hard disks 3 and reproduces and outputs AV data recorded on the hard disks 3.

Figure 2:
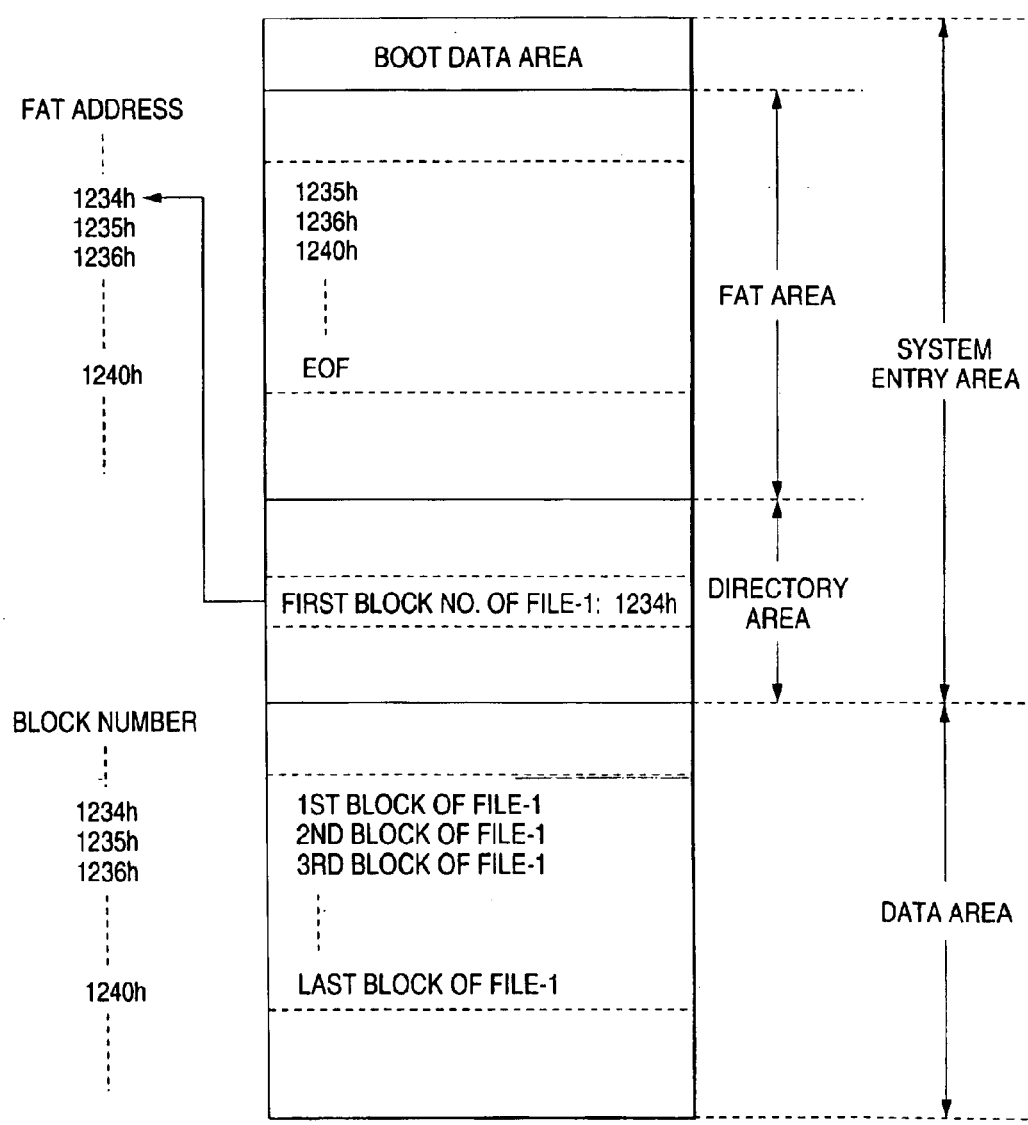
FIG. 2 shows recording areas of hard disks of the hard disk apparatus of FIG. 1.

The hard disks 3 are formatted as shown in FIG. 2. That is, the information recording surface of each hard disk 3 is divided into an inner area and an outer area, which are assigned to a system entry area and a data area, respectively.

The data area is subdivided into clusters, and video data and audio data of a data amount that is equal to a predetermined number of frames are recorded in each cluster. In this embodiment, AV data of 1 GOP are assigned to one cluster in recording AV data that are compressed according to the MPEG (Moving Picture Experts Group) format on the hard disks 3.

The information recording surface of each hard disk 3 is sectioned into a plurality of concentric zones, and each of the tracks of each zone is sectioned into a plurality of sectors having a predetermined length in the longitudinal direction. Each hard disk 3 is so configured that the number of sectors per track gradually increases as the zone position goes outward, whereby the information recording surface can be utilized efficiently by using the zone bit recording technique in which the recording frequency is varied with the zone.

In the hard disks 3 that are zoned and sectored in the above manner, a physical address is set by using an information recording surface number, one of track numbers that are assigned consecutively to the tracks of each information recording surface starting from the outermost track, and a sector number that specifies a sector of each track. File management of user data is performed by using logical addresses that are consecutively set so as to correspond to the physical addresses starting from the outermost track of each information recording surface.

The logical address is represented by a cluster number, in units of a cluster being a collection of a plurality of logical sectors. The logical sector is a region corresponding to a data recording unit that is set starting from the head region (0th sector; in this case, located on the outermost track) of each information recording surface. In this embodiment, one physical sector corresponds to one logical sector and the logical sector number is given according to the following Equation (1). In Equation (1), the surface number, the track number, and the sector number are those of the physical address.

Equation (1):

$$\text{(Logical sector number)}=\text{(number of sectors per track)}\times\{\text{(surface number)}+\text{(number of surfaces)}\times\text{(track number)}\}+\text{(sector number)}-1 \ldots \quad (1)$$

In this embodiment, the logical sectors are so formed that data of 512 bytes in terms of user data can be recorded in each logical sector, and one cluster is formed by a plurality of logical sectors. In general, one cluster consists of a power-of-2 sectors. In the data area in which user data is to be recorded, and each cluster is identified by one of block numbers (cluster numbers) that are consecutive numbers in which the head of a file area is given a number 2.

The data area is assigned block numbers that are addresses of the respective clusters that are set in the above manner so that the data area is accessed on a cluster-by-cluster basis by using block numbers as a reference. In this embodiment, the block number is a 4-figure hexadecimal number.

On the other hand, the system entry area is divided into a boot area, an FAT (fail allocation table) area, and a directory area. Data necessary for booting of the hard disks 3 are recorded in the boot area. Address information etc. that are necessary for access of AV data recorded in the data area are recorded in the FAT area and the directory area.

Specifically, the file names of respective files recorded in the data area, the block numbers of head blocks as the recording start positions of respective files, and other information are recorded in the directory area. The block numbers of respective blocks that immediately follow the head block of each file and other information are recorded in the FAT area. In the hard disks 3 thus formatted, the addresses of consecutive clusters constituting one file can be detected by detecting the head block number of a desired file name from the directory area and then sequentially detecting block numbers immediately following the head block number from the FAT area.

As shown in FIG. 2, in a case where file-1 is recorded in clusters having block numbers 1234h–1240h of the data area, a code indicating the block number 1234h of the first block of file-1 is recorded in the directory area and block numbers immediately following the block number 1234h are consecutively recorded in corresponding regions of the FAT area. In FIG. 2, the term EOF (end of file) is identification information indicating the last block of one file.

More specifically, file management data having a structure shown in FIG. 3 is recorded in the directory area for each file that is recorded in the data area. In the file management data, the first 8 bytes are assigned to a file name and the next 3 bytes are assigned to a file extension. The next 1 byte is assigned to data indicating the attribute of the file and the next 10 bytes are assigned to reserve data. The next three sections each being 2 bytes are assigned to recording start time data, recording date data, and a cluster number that is a head block number, respectively. The last 4 bytes are assigned to file length data.

On the other hand, as shown in FIG. 2, block addresses are assigned to respective block numbers (cluster numbers) of the data area and the block addresses of clusters following each head block address are recorded in the FAT area. Further, as shown in FIG. 4, among codes that are not assigned to any block number, prescribed codes are assigned to pieces of identification information indicating a free region, a defective cluster, and EOF.

In the hard disks 3 thus formatted, free regions of the data area can be detected by accessing the FAT area.

As shown in FIG. 1, an interface control circuit 4, which is an SCSI (small computer system interface) controller, an IDE (intelligent drive electronics) controller, or the like, serves as an input/output circuit for data, control commands, addresses that are exchanged between the head disk apparatus 1 and the AV apparatus 2. A buffer memory 5 temporarily holds AV data that is subjected to input/output between a hard disk control circuit 6 and the interface control circuit 4.

A servo circuit 7 drives a motor (M) 8 under the control of the hard disk control circuit 6, thereby rotating the hard disks 3 at a prescribed rotation speed. The servo circuit 7 drives a motor (M) 9 in a similar manner, thereby performing magnetic head seeking and tracking control.

During recording, a read data channel section 10 adds, under the control of the hard disk control circuit 6, error correcting codes to AV data that is input from the hard disk control circuit 6. Further, the read data channel section 10 generates bit-series data by coding the AV data according to a scheme suitable for the characteristics of the recording/reproduction system, and drives a magnetic head based on the generated data. During reproduction, the read data channel section 10 generates reproduction data by performing signal processing on a reproduction signal that is obtained by a magnetic head, reproduces AV data by performing error correction processing on the reproduction data, and outputs the reproduced AV data to the hard disk control circuit 6.

Like the system entry area of the hard disks 3, the internal recording area of a system entry memory 11, which is a nonvolatile memory, is divided into a boot area, an FAT area, and a directory area. The system entry memory 11 holds, in these areas, the same data as recorded in the respective areas of the system entry area of the hard disks 3. Under the control of the hard disk control circuit 6, the contents of the system entry memory 11 are updated sequentially as AV data is recorded on the hard disks 3 on a cluster-by-cluster basis. Further, the system entry memory 11 outputs data held therein to the hard disk control circuit 6 with prescribed timing.

The hard disk control circuit 6, which is a controller for controlling the operation of the hard disk apparatus 1, analyzes a control command that is input from the interface control circuit 4 and controls the entire operation by executing a prescribed process in accordance with a result of the analysis.

Figure 5:
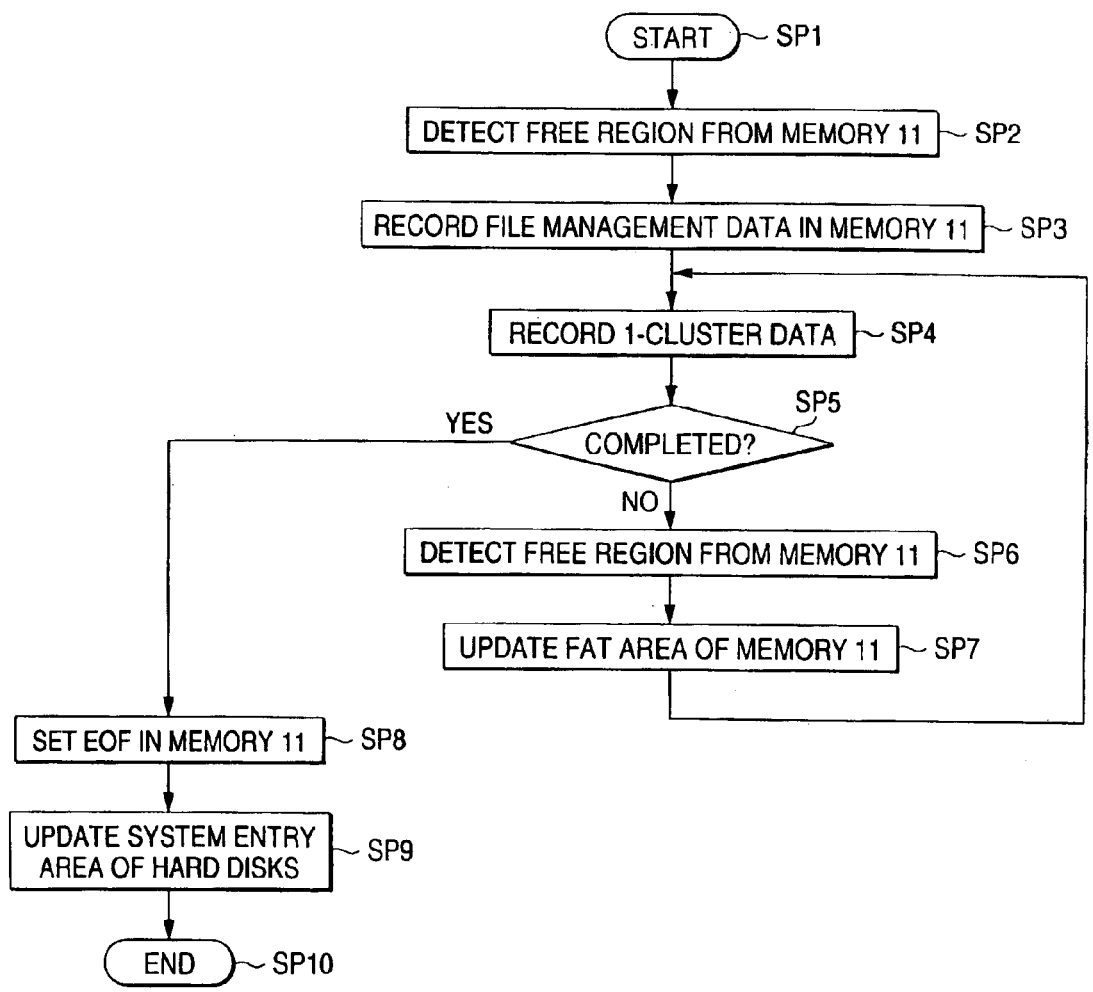
FIG. 5 is a flowchart showing a process that is executed by a hard disk control circuit of the hard disk apparatus of FIG. 1 during recording.

FIG. 5 is a flowchart showing a process that is executed by the hard disk control circuit 6. The hard disk control circuit 6 executes this process when receiving a write control command from the AV apparatus 2. That is, when the hard disk control circuit 6 receives a write control command, the process goes from step SP1 to step SP2, where the hard disk control circuit 6 searches the FAT area of the system entry memory 11 for the code 0000$h$ of a free region shown in FIG. 4 and thereby detects a free region of the hard disks 3.

Then, the process goes to step SP3, where the hard disk control circuit 6 generates file management data based on a file name and an extension that are added to the write control command and the block number of the free region that was detected at step SP2, and records the generated file management data in the system entry memory 11. The process then goes to step SP4, where the hard disk control circuit 6 records AV data of one cluster in the free region of the hard disks 3 that was detected at step SP2.

Then, the process goes to step SP5, where the hard disk control circuit 6 judges whether all AV data have been recorded. If a negative judgment result is obtained, the process goes to step SP6, where the hard disk control circuit 6 detects the next free region of the hard disks 3 from the FAT area of the system entry memory 11. The process then goes to step. SP7, where the hard disk control circuit 6 updates the contents of a region of the FAT area of the system entry memory 11 that corresponds to the cluster in which the AV data was recorded at step SP4 so that the cluster number (block number) of the free region that was detected at step SP6 is identified. The process then returns to SP4.

By repeatedly executing steps SP4–SP7, the hard disk control circuit 6 sequentially detects free regions from the system entry memory 11 and records AV data on a cluster-by-cluster basis. In synchronism with this operation, the hard disk control circuit 6 sequentially updates the FAT area of the system entry memory 11.

When all the AV data have been recorded by repeating the above cluster recording operation, an affirmative judgment result is obtained at step SP5, whereupon the process goes to step SP8. At step SP8, the hard disk control circuit 6 sets one of the codes FFF8$h$ to FFFFh indicating EOF for a region of the FAT area of the system entry memory 11 that corresponds to a cluster in which AV data were recorded immediately before at step SP4.

Then, the process goes to step SP9, where the hard disk control circuit 6 updates the system entry area of the hard disks 3 based on the data that have been recorded in the system entry memory 11. The process then goes to step SP10, where the execution of the process is finished. In this manner, during recording of AV data, the hard disk control circuit 6 accesses the data area of the hard disks 3 based on data recorded in the system entry memory 11.

Figure 6:
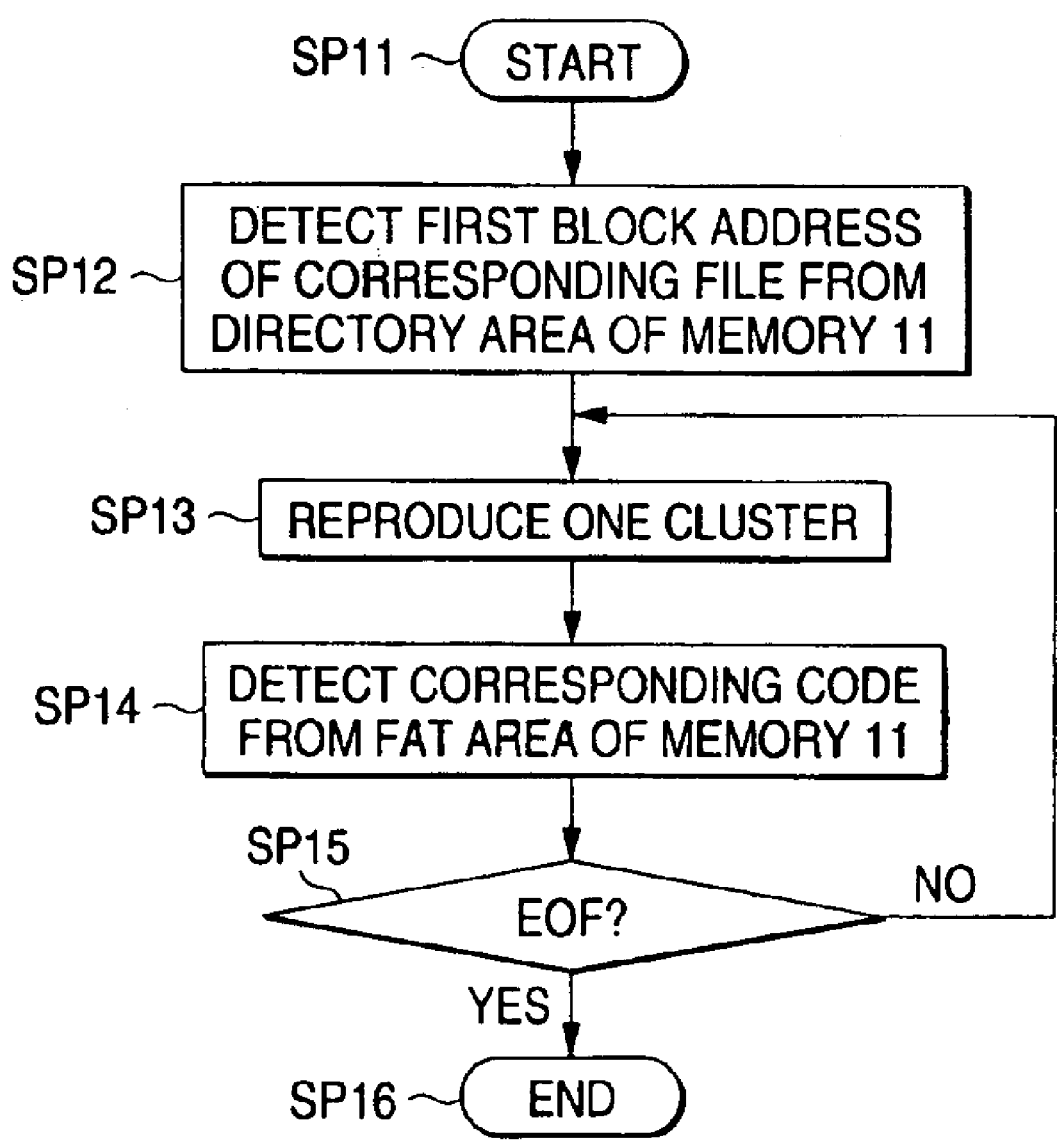
FIG. 6 is a flowchart showing a process that is executed by the hard disk control circuit shown in FIG. 1 during reproduction.

On the other hand, FIG. 6 is a flowchart showing a process that is executed by the hard disk control circuit 6 when it receives a reproduction control command. When the hard disk control circuit 6 receives a reproduction control command, the process goes from step SP11 to step SP12, where the hard disk control circuit 6 searches the directory area of the system entry memory 11 based on a file name that is added to the control command and thereby detects corresponding file management data recorded in the directory area. Further, the hard disk control circuit 6 detects the head block number of the file designated by the control command from the detected file management data.

Then, the process goes to step SP13, where the hard disk control circuit 6 reproduces a cluster of the hard disks 3 that is identified by the head block number. At the next step SP14, the hard disk control circuit 6 detects a corresponding code that is in the form of a FAT address by searching the FAT area of the system entry memory 11.

Then, the process goes to step SP15, where the hard disk control circuit 6 judges whether the code that was detected at step SP14 is a code indicating the end of the file (EOF). If a negative result is obtained at step SP15, the process returns to step SP13, where the hard disk control circuit 6 reproduces a cluster of the hard disks 3 that is identified by the code.

As described above, when receiving a reproduction control command, the hard disk control circuit 6 detects the head block number of a corresponding file from the directory area and then sequentially reproduces AV data by sequentially detecting block numbers following the head block number from the FAT area by repeatedly executing steps SP13–SP15.

If a code indicating the end of the file (EOF) is detected after sequential reproduction of clusters, the process goes to step SP16, where the hard disk control circuit 6 finishes the execution of the process. In this manner, the hard disk control circuit 6 accesses the hard disks 3 based on data recorded in the system entry memory 11 also during reproduction of AV data.

Figure 7:
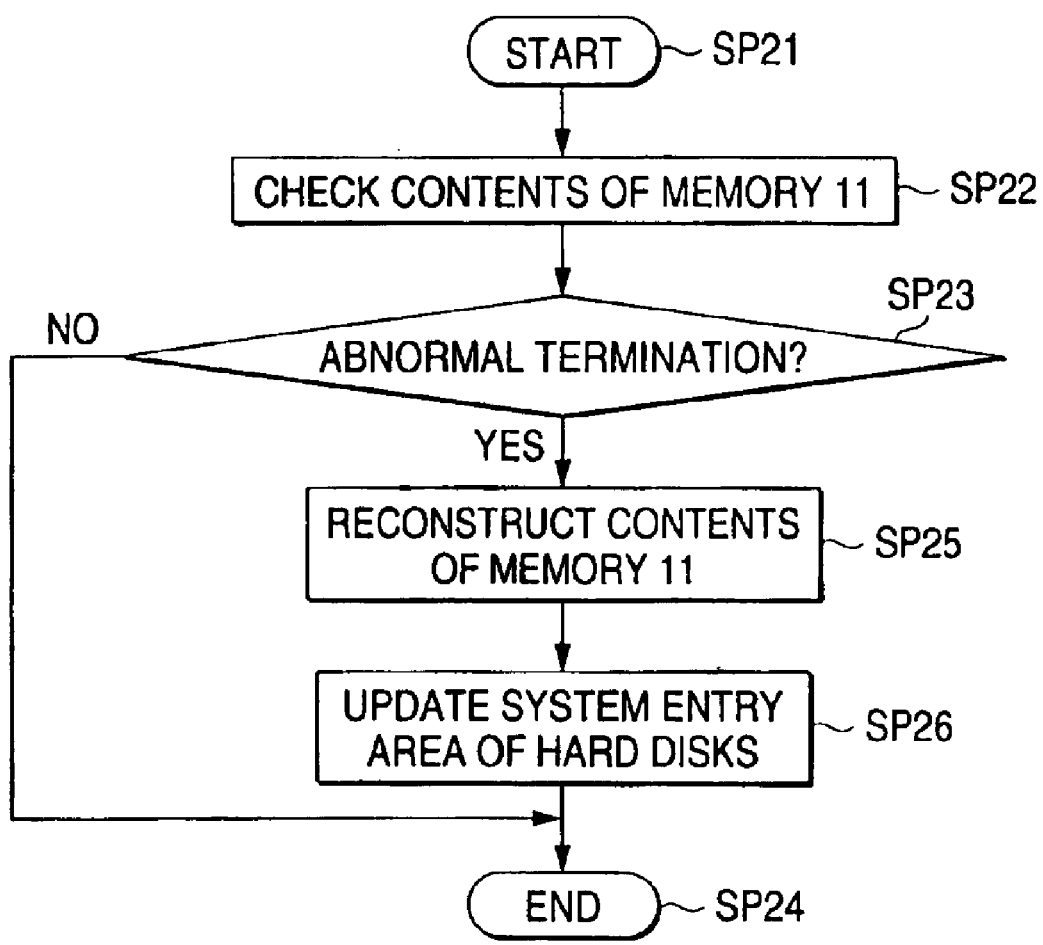
FIG. 7 is a flowchart showing a process that is executed by the hard disk control circuit shown in FIG. 1 to cope with an abnormal termination.

On the other hand, FIG. 7 is a flowchart showing a process that is executed by the hard disk control circuit 6 at starting. When supplied with power, the hard disk control circuit 6 initializes the entire hard disk apparatus 1 in accordance with the contents of the boot area of the system entry memory 11 and then executes the process of FIG. 7. Specifically, the process goes from step SP21 to step SP22, where the hard disk control circuit 6 checks the contents of the system entry memory 11.

The hard disk control circuit 6 judges whether EOF is set for each file management data that is recorded in the directory area by sequentially tracing the data of the FAT area. At the occurrence of an abnormal termination such as one at a power shutoff, a recording operation is interrupted and hence it is difficult to record EOF for file management data concerned.

If there exists no file management data for which EOF is not set, the hard disk control circuit 6 judges at the next step SP23 that no abnormal termination occurred. The process then goes to step SP24, where the execution of the process is finished.

On the other hand, if there exists at least one file management data for which EOF is not set, the hard disk control circuit 6 judges that an abnormal termination occurred. The process goes from step SP23 to step SP25, where the hard disk control circuit 6 detects an FAT address corresponding to a cluster that was successfully recorded immediately before the abnormal termination by sequentially tracing the codes for the file management data concerned in the FAT area. Further, the hard disk control circuit 6 sets an EOF code in the region of this FAT address and thereby reconstructs the contents of the system entry memory 11.

Then, the process goes to step SP26, the hard disk control circuit 6 updates the system entry area of the hard disks 3 based on the contents of the system entry memory 11. The process then goes to step SP24, where the execution of the process is finished. In this manner, the hard disk apparatus 1 can reproduce so far recorded AV data even at: the occurrence of an abnormal termination.

Further, prior to execution of the process of FIG. 7, the hard disk control circuit 6 checks the contents of the system entry area of the hard disks 3 and the contents of the system entry memory 11. In doing so, if data cannot be received correctly from the system entry area or the system entry memory 11 due to a crash of the hard disks 3, an abnormality in a memory chip constituting the system entry memory 11, or some other reason, the hard disk control circuit 6 rewrites the contents of one of the system entry area of the hard disks 3 and the system entry memory 11 where the abnormality occurred based on the contents of the other. This allows the hard disk apparatus 1 to reproduce recorded AV data even if an abnormality occurs due to, for example, a drop during carrying of the hard disk apparatus 1. The reliability of the hard disk apparatus 1 is increased so much.

(1-2) Operation of First Embodiment

If the hard disk apparatus 1 having the above configuration (see FIG. 1) receives a recording control command from the AV apparatus 2 such as an imaging apparatus or a set-top box to which the hard disk apparatus 1 is attached, AV data that is input after the control command is supplied to the read data channel section 10 via the hard disk control circuit 6. The AV data is modulated by the read data channel section 10 into a format that is suitable for recording, and then recorded on the hard disks 3 by driving a magnetic head.

If a reproduction control command is input in a state that the hard disk apparatus 1 is attached to the AV apparatus 2 or removed from it and attached to another AV apparatus, a reproduction signal that is obtained from the magnetic head is processed by the read data channel section 10 and AV data is reproduced and output to the AV apparatus 2 via the hard disk control circuit 6 and the interface control circuit 4.

When the hard disk apparatus 1 performs recording or reproduction, free regions of the hard disks 3 are detected by accessing the system entry memory 11 or the addresses of AV data for which a reproduction instruction has been received are detected. As a result, in the hard disk apparatus 1, the data area of the hard disks 3 can be accessed without the need for accessing the system entry area of the hard disks 3 each time and hence the data area can be accessed with a so much shorter waiting time. Therefore, in this embodiment, high-transfer-rate AV data can be recorded or reproduced on a real-time basis without interruption. By virtue of a short waiting time, the capacity of the buffer memory 5 for temporarily holding AV data can be reduced and the entire configuration can be simplified so much.

Specifically, as shown in FIG. 6, when the hard disk apparatus 1 receives a reproduction command, corresponding file management data is retrieved from the directory area of the system entry memory 11 and the head block number (head cluster number) of the reproduction-instructed file is detected based on the detected file management data. Then, the block number immediately following the head block number is detected by searching recorded FAT addresses corresponding to the head block number. Subsequently, the block numbers of consecutive clusters are detected sequentially by searching the FAT area in similar manners until EOF corresponding to the last block of the file is detected. In this manner, in the hard disk apparatus 1, AV data of blocks corresponding to respective block numbers are reproduced sequentially while the block numbers are detected. Therefore, the AV data can be reproduced by accessing the data area of the hard disks 3 without the need for accessing the system entry area of the hard disks 3 each time.

On the other hand, also in the case of recording, by recording AV data by checking free regions by likewise referring to the system entry memory 11, the AV data can be recorded by accessing the data area of the hard disks 3 without the need for accessing the system entry area of the hard disks 3 each time.

In the hard disk apparatus 1, AV data is recorded on a cluster-by-cluster basis while free regions are detected by referring to the system entry memory 11 that is a nonvolatile memory. In synchronism with this processing of the recording system, contents of the system entry memory 11 corresponding to recording-completed blocks are updated sequentially. This enables use of so far recorded AV data even at the occurrence of an abnormal termination such as one at a power shutoff.

Specifically, as shown in FIG. 5, in the hard disk apparatus 1, during recording, the block number (FAT address) of a free region is detected from the FAT area of the system entry memory 11 and corresponding file management data is recorded in the directory area of the system entry memory 11 based on the above detection result and a recording command. Free regions following the above first free region are sequentially detected, and codes indicating those consecutive free regions are sequentially set in the FAT area. An EOF code is set for the last block. In the hard disk apparatus 1, AV data are sequentially recorded in blocks of respective free regions while the free regions are detected. Therefore, the AV data can be recorded by accessing the data area of the hard disks 3 without the need for accessing the system entry area of the hard disks 3 each time.

Further, in the hard disk apparatus 1, after the recording, the contents of the system entry memory 11 are recorded in the system entry area of the hard disks 3.

If the power is shut off, the recording is suspended because of occurrence of an abnormality in some apparatus, or the hard disk apparatus 1 is erroneously removed from the AV apparatus during the recording in a process that AV data are recorded sequentially, EOF indicating the end of a file is not set in the system entry memory 11. As shown in FIG. 7, in the hard disk apparatus 1, the contents of the system entry memory 11 are checked when the power is turned on. If file management data for which EOF is not set is detected, codes of the FAT area are sequentially traced based on the FAT address of the head block number that is recorded as part of the file management data and a block number for which processing was done successfully immediately before the abnormal termination is detected based on the codes that are set in the FAT area. An EOF code is set instead of this block number. This makes it possible to use even a file for which recording has not completed yet.

Further, in the hard disk apparatus 1, the system entry area of the hard disks 3 and the system entry memory 11 hold the same data. If an abnormality is found in the system entry area of the hard disks 3 or the system entry memory 11 in the above-described check that is performed when the power is turned on, the contents of one of the system entry area of the hard disks 3 and the system entry memory 11 where no abnormality has occurred are rewritten to the other.

This allows the hard disk apparatus 1 to reproduce recorded AV data even when an abnormality occurs due to, for example, a drop during carrying of the hard disk apparatus 1, and the reliability of the hard disk apparatus 1 is increased so much.

(1-3) Advantages of First Embodiment

In the above configuration, address information etc. that are necessary for access of the data area of the hard disks 3 are recorded in the system entry memory 11 that is a nonvolatile memory and the data area of the hard disks 3 is accessed based on the contents of the system entry memory 11. Therefore, the data area can be accessed with a short waiting time.

Continuous AV data is recorded in the hard disks 3 so as to be sectioned into clusters. In synchronism with this processing of the recording system, contents of the system entry memory 11 that correspond to recording-completed clusters are sequentially updated. Therefore, so far recorded data can be used as effective data even at the occurrence of an abnormal termination.

Further, since the system entry area of the hard disks 3 and the system entry memory 11 hold the same data, recorded AV data can be reproduced even when an abnormality occurs due to, for example, a drop during carrying of the hard disk apparatus 1. The reliability of the hard disk apparatus 1 is increased so much. In particular, since the hard disk apparatus 1 is detachably held by any of various kinds of AV apparatuses, increased reliability improves the ease of use.

(2) Second Embodiment (2-1) Configuration of Second Embodiment

Figure 8:
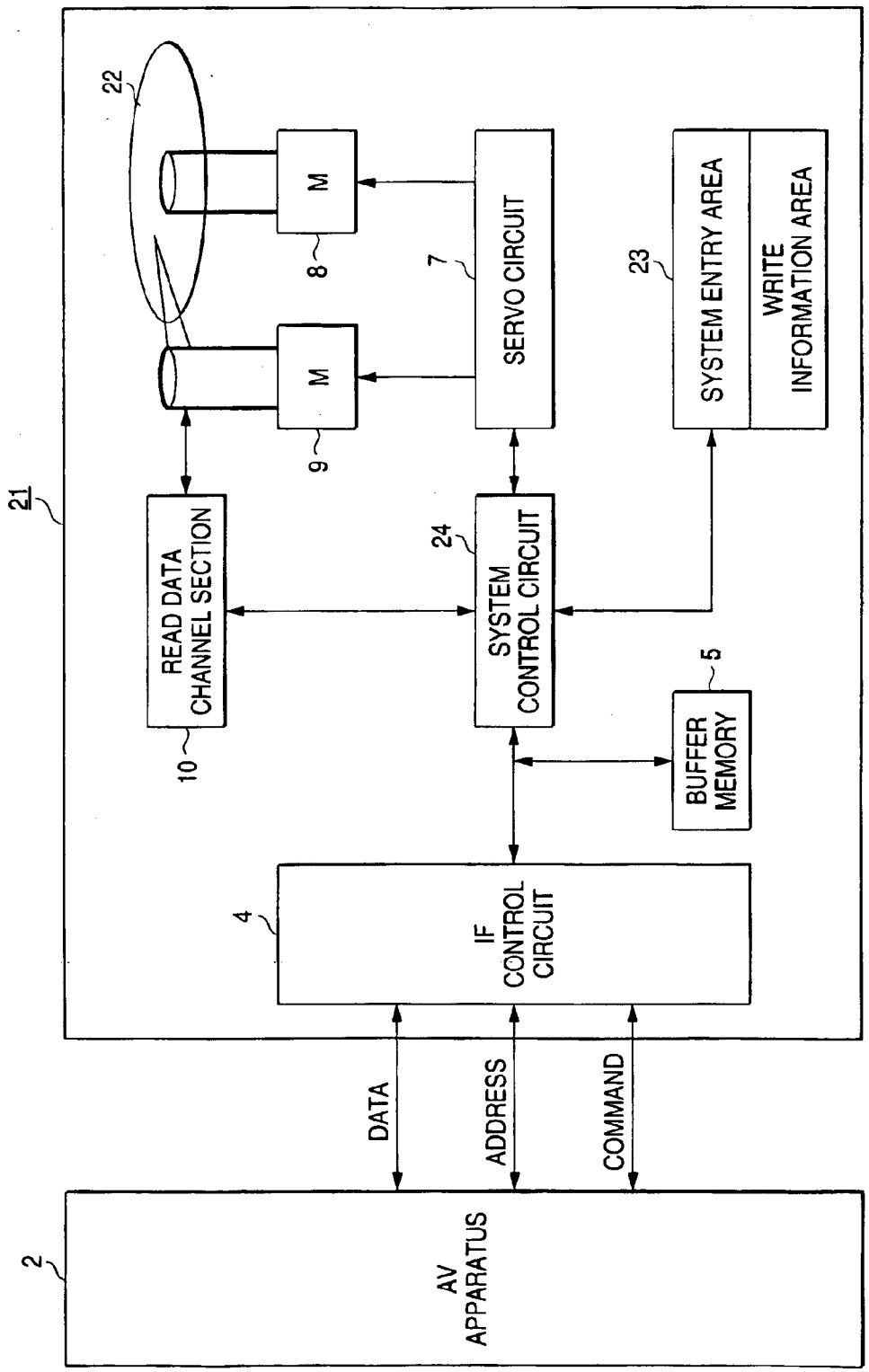
FIG. 8 is a block diagram showing a hard disk apparatus according to a second embodiment of the invention.

FIG. 8 is a block diagram showing a hard disk apparatus 21 according to a second embodiment. In the hard disk apparatus 21, the data area and the system entry area that were described above with reference to FIG. 2 are formed on hard disks 22 and in a system memory 23, respectively, and a write-information area is formed in the system memory 23. The components of this embodiment having the same components in the above-described hard disk apparatus 1 with reference to FIG. 1 are given the same reference numerals as the latter and redundant descriptions will be avoided.

Specifically, the data area is formed on the hard disks 22 on a cluster-by-cluster basis (block-by-block basis) in the same manner as in the above-described case of the hard disks 3 with reference to FIG. 1. On the other hand, information to be recorded in the system entry area of the hard disks 3 that was described above with reference to FIG. 1 is recorded in the system entry area of the system memory 23, which is a nonvolatile memory. That is, in the hard disk apparatus 21, address information that is necessary for access of the hard disks 22 is recorded in the system memory 23, whereby the data area of the hard disks 22 can be accessed with a short waiting time.

Further, information that enables judgment of whether data is being written or not and information that enables recognition of the status of progress of the data writing are recorded in the write information area of the system memory 23. Recorded contents are reset upon completion of the data writing. Examples of those kinds of information are a write underway flag indicating that data is being written to the hard disks 22, a write head block number indicating the head block number of a file that is being written to the hard disks 22, and a number-of-written-blocks count value indicating the number of writing-completed blocks of the file.

A system control circuit 24 records data that is input from the AV apparatus 2 on the hard disks 22 while sequentially updating the contents of the write information area. The system control circuit 24 accesses the contents of the write information area at starting. Therefore, even at the occurrence of an abnormal termination, data that has been recorded before the abnormal termination can be used as effective data.

Figure 9:
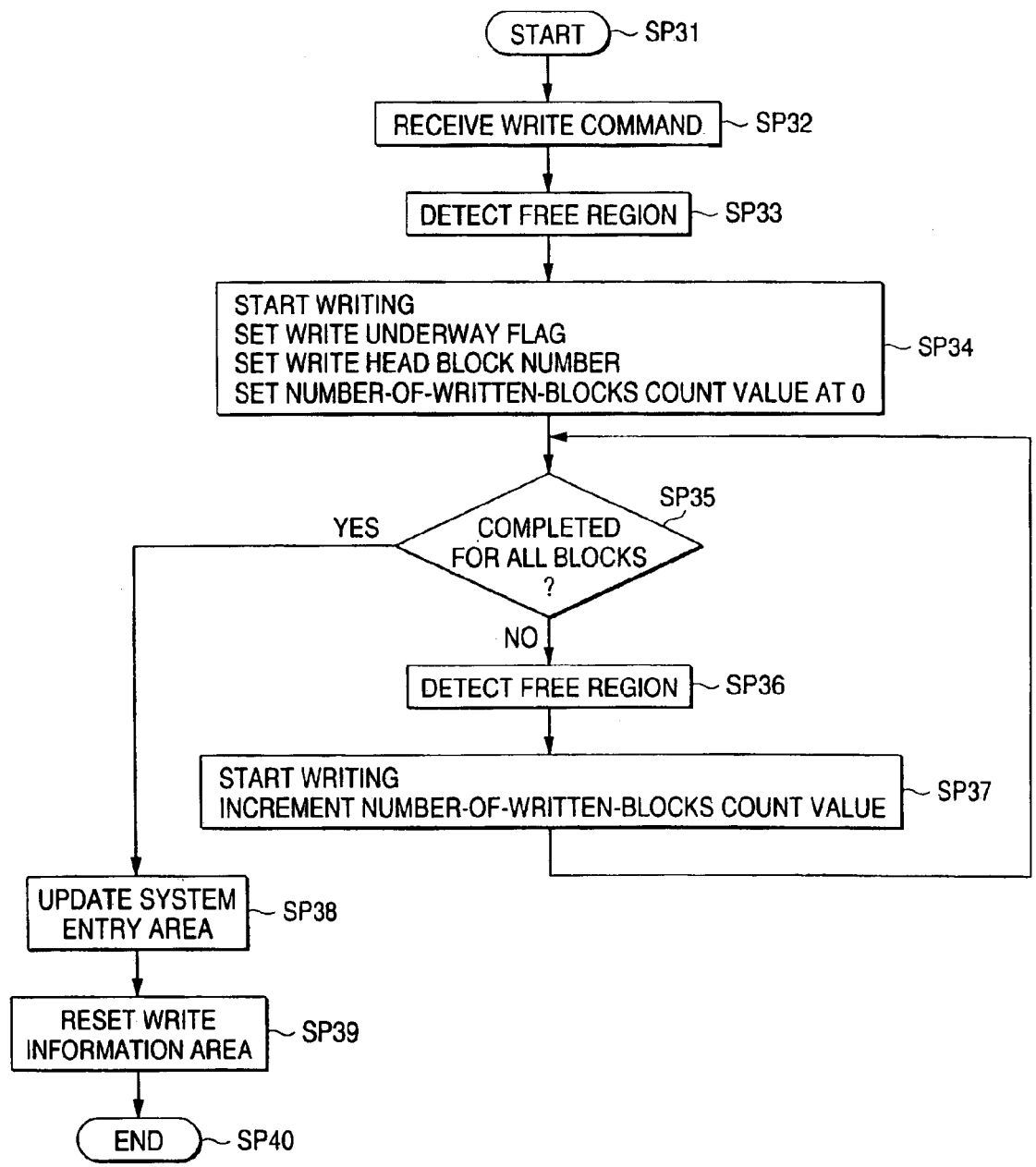
FIG. 9 is a flowchart showing a process that is executed by a system control circuit of the hard disk apparatus of FIG. 8 during writing.

FIG. 9 is a flowchart showing a process that is executed by the system control circuit 24 during writing. The process goes from step SP31 to step SP32, where the system control circuit 24 receives a write command. Then, the process goes to step SP33, where the system control circuit 24 detects a free region of the hard disks 22 by searching the FAT area of the system entry area that is formed in the system memory 23.

Then, the process goes to step. SP34, where the system control circuit 24 control the entire operation so that one block of AV data that is input from the AV apparatus 2 is recorded in this free region. In parallel with this control, the system control circuit 24 updates the write information area so as to allow recognition of the fact that data is being written as well as recognition of the status of progress of this data writing.

Specifically, the system control circuit 24 sets a write underway flag and thereby records, in the system memory 23, the fact that data is being written. Further, the system control circuit 24 sets, as a write head block number, the block number of the free block that was detected at step SP33, and sets the number-of-written-blocks count value at 0. After completion of the writing of one block, the system control circuit 24 increments the number-of-written-blocks count value by 1.

Then, the process goes to step SP35, where the system control circuit 24 judges whether all blocks have been written. If a negative result is obtained at step SP35, the process goes to step SP36, where a free region of the hard disks 22 is detected in the same manner as at step SP33.

Then, the process foes to step SP37, where the system control circuit 24 controls the entire operation so that 1-block AV data that is input from the AV apparatus 2 is recorded in the free region just detected. After the recording of the 1-block data has been completed by the above control, the system control circuit 24 updates the write information area; specifically, the system control circuit 24 increments the number-of-written-blocks count value so as to allow recognition of the fact that the data writing has made a progress. The process then returns to step SP35.

In this manner, after updating the contents of the write information area so as to allow recognition of the fact that writing is underway, the system control circuit 24 repeatedly executes steps SP35–SP37. That is, while sequentially recording AV data on a block-by-block basis (one block: recording unit), the system control circuit 24 sequentially updates the contents of the write information area so as to allow recognition of the status of progress of the data writing in accordance with the AV data recording. In parallel with the updating of the contents of the write information area, the system control circuit 24 sequentially records block numbers indicating subsequent blocks in the FAT area of the system entry area.

If the recording of the AV data has completed as a result of repetitive AV data writing operations, an affirmative result is obtained at step SP35, whereupon the process goes to step SP38. At step SP38, the system control circuit 24 updates the system entry area so that it reflects the recording of a series of data. Since a subsequent block number is recorded in the FAT area in parallel with recording of 1-block AV data, the system control circuit 24 sets EOF in a region of the FAT area that corresponds to the last block. Further, the system control circuit 24 updates the system entry area by recording file management data as described above with reference to FIG. 3 in the directory area.

Then, the process goes to step SP39, where the system control circuit 24 resets the write information area by resetting the write underway flag. The process then goes to step SP40, where the execution of the process is finished.

In this manner, if writing is terminated abnormally in the system control circuit 24, a write underway flag is kept set in the system memory 23. Therefore, at the next starting, the system control circuit 24 can judge based on the write underway flag whether an abnormal termination occurred during writing. Further, if an abnormal termination occurs, information indicating the status of progress of the data writing at the time of the abnormal termination is held as it is. Therefore, at the next starting, the system control circuit 24 can cope with the abnormal termination by detecting the information indicating the status of progress of the data writing.

Figure 10:
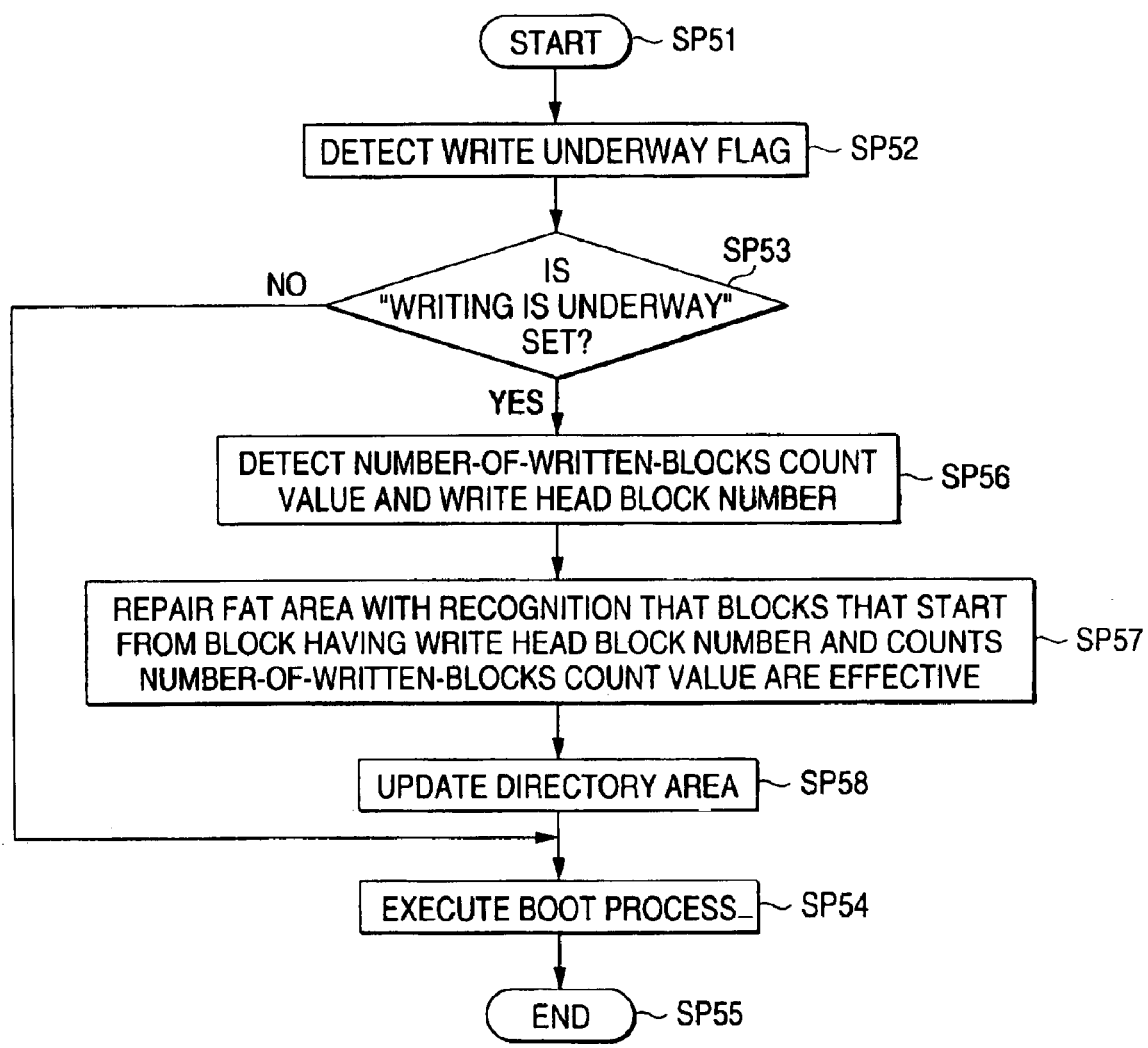
FIG. 10 is a flowchart showing a process that is executed by the system control circuit of the hard disk apparatus of FIG. 8 at starting.

Specifically FIG. 10 is a flowchart showing a process that is executed by the system control circuit 24 when the power is turned on. When the power is turned on, the process goes from step SP51 To step SP52, where the system control circuit 24 accesses the write information area of the system memory 23 and detects a write underway flag. The process then goes to step SP53, where the system control circuit 24 judges whether the detected write underway flag is set as "writing is underway," and thereby judges whether the stop of operation that was done immediately before the turning-on of the power is an abnormal termination during data writing.

If a negative result is obtained at step SP53, the process goes to step SP54, where the system control circuit 24 executes a boot process based on boot data that are recorded in the system entry area of the system memory 23. The process then goes to step SP55, where the execution of the process is finished.

On the other hand, an affirmative result is obtained at step SP53, and then the process goes to step SP56, where the system control circuit 24 detects, from the write information area of the system memory 23, information indicating the status of progress of data writing at the occurrence of the abnormal termination.

Specifically, the system control circuit 24 detects the head block number of a file that was being recorded at the time of the abnormal termination based on the write head block number that is recorded in the write information area. Further, the system control circuit 24 detects what number of blocks as measured from the head block had been written successfully at the time of the abnormal termination based on the number-of-written-blocks count value in the write information area.

At the next step SP57, the system control circuit 24 repairs the FAT area with a recognition that AV data of blocks that start from the block having the detected head block number and counts the number-of-written-blocks count value were recorded correctly. In this case, since consecutive block numbers corresponding to the number-of-written-blocks count value should be recorded correctly in the FAT area, the system control circuit 24 repairs the FAT area by sequentially tracing FAT addresses by the number of blocks that is equal to the number-Of-written-blocks count value starting from the head block number, and setting EOF for the last data-writing-completed block.

Then, the process goes to step SP58, where the system control circuit 24 records file management data in accordance with the repairing of the FAT area so that an abnormally terminated file with the repaired FAT area can be detected by searching the directory area. After the system entry area is repaired in the above manner so that even the file that was being recorded at the time of the abnormal termination can receive file management in the same manner as other files, the process goes from step SP58 to step SP54, where the system control circuit 24 executes the boot process. The process then goes to step SP55, where the execution of the process is finished.

With the configuration according to the second embodiment, the data area can be accessed with a short waiting time as in the case of the first embodiment, though address information that is necessary for access of the data area of the hard disks 22 is recorded in only the nonvolatile memory 23.

Since no system entry area is formed on the hard disks 22, occurrence of an abnormality due to an external disturbance such as a drop can be prevented so much more reliably than in the case where a system entry area is formed on the hard disks.

Since AV data is recorded while information that allows recognition of the fact that data is being written and information that allows recognition of the status of progress of the data writing are recorded in the nonvolatile memory 23, so far recorded data can be used as effective data even when an abnormal termination occurs.

Further, since the above kinds of information are expressed as the write underway flag indicating that data is being written, the write head block number indicating the head block number of a file being written, the number-of-written-blocks count value indicating the number of writing-completed blocks, those kinds of information are recorded with a simple configuration and so far recorded data can be used as effective data even when an abnormal termination occurs. Further, repairing work that is done at the occurrence of an abnormal termination can be simplified.

(3) Other Embodiments

In the first embodiment completely the same data are recorded in the system entry area of the hard disks 3 and the system entry memory 11, and in the second embodiment the system entry area is formed only in the system memory 23. However, the invention is not limited to those cases. The important point is that address data that is necessary for access of the data area be held in a nonvolatile memory. For example, as for file management data, recording of an attribute etc. in the system entry memory may be omitted.

Although in the second embodiment the write underway count value is recorded separately from the write underway flag, the invention is not limited to such a case. The write underway count value may also serve as the write underway flag. That is, it is possible to judge whether an abnormal termination occurred by resetting the write underway count value to 0 when file writing has completed correctly and judging, at starting, whether the write underway count value is 0 or not. This makes it possible to cope with an abnormal termination with an even simpler configuration.

Although the above embodiments are directed to the case of coping with an abnormal termination at starting, the invention is not limited to such a case. It is possible to cope with an abnormal termination at various necessary time points such as at a start of the next writing, for example.

The above embodiments are directed to the case where the data area of the hard disks 3 or 22 is managed by the FAT file system. However, the invention is not limited to such a case and can be applied to a broad range in which the data area is managed by any of various file management systems.

Although the above embodiments are directed to the case where the invention is applied to a removable hard disk apparatus. However, the invention is not limited to such a case and can broadly be applied to various disk apparatuses such as a phase change type optical disc apparatus and an optical disc apparatus according to thermomagnetic recording.

As described above, in the invention, at least address information that is necessary for access of an input data recording area of a disk-shaped recording medium is recorded in a nonvolatile memory. Therefore, the data area can be accessed with a short waiting time and so far recorded data can be used as effective data even at the occurrence of an abnormal termination.

What is claimed is:

1. A disk apparatus comprising:
    recording means for recording input data having a plurality of block numbers associated therewith on a disk-shaped recording medium;
    a nonvolatile memory in which at least address information including the plurality of block numbers that is necessary for access of an input data recording area of the disk-shaped recording medium is to be recorded;
    memory control means for recording the address information in the nonvolatile memory; and
    reproducing means for reproducing data recording recorded on the disk-shaped medium based on contents of the nonvolatile memory,
    wherein, upon receipt of a reproduction command, said reproducing means detects a head block number and any subsequent block numbers stored in said nonvolatile memory corresponding to the desired data to be reproduced, wherein said desired data is reproduced from the disk-shaped medium simultaneously with the detection of said subsequent block numbers,
    wherein the recording means records continuous input data on the disk-shaped recording medium in units of a prescribed block that is set for the disk-shaped recording medium; the address information is formed by data indicating consecutive blocks for one file of the input data; the memory control means records identification information indicating a file end in the nonvolatile memory for a last block of the one file, and sets the identification information based on the address information at starting; and
    wherein the memory control means sets the identification information based on the address information in the nonvolatile memory at start of operation of said disk apparatus; and the memory control means checks if the identification information indicating a file end is recorded for a last block of each file, and sets the identification information indicating a file end is recorded by detecting a successfully recorded block immediately before there is no identification information indicating a file end is recorded for a last block of the file.

2. The disk apparatus according to claim 1, wherein:
    the recording means records continuous input data on the disk-shaped recording medium in units of a prescribed block that is set for the disk-shaped recording medium; and
    the memory control means sequentially records the address information corresponding to respective recording-completed blocks in the nonvolatile memory in synchronism with operation of the recording means.

3. The disk apparatus according to claim 1, wherein the recording means records the data as held by the nonvolatile memory in a prescribed area of the disk-shaped recording medium.

4. The disk apparatus according to claim 1, wherein:
    the disk apparatus is detachably held by a prescribed video apparatus; and
    the input data is video data that is output from the video apparatus.

5. The disk apparatus according to claim 1, wherein:
    the recording means records the input data on the disk-shaped recording medium in units of a prescribed block that is set for the disk-shaped recording medium; and
    the memory control means records, during recording of the input data, identification information indicating that the input data is being recorded in the nonvolatile memory, and sequentially records the address information and data indicating a status of progress of the recording or the input data both of which correspond to respective recording-completed blocks in the nonvolatile memory in synchronism with the operation of the recording means.

6. The disk apparatus according to claim 1, wherein the memory control means accesses the nonvolatile memory at a prescribed time point, and repairs the contents of the nonvolatile memory based on a result of the access.

7. The disk apparatus according to claim 5, wherein the memory control means accesses the nonvolatile memory at a prescribed time point, judges whether an abnormal termination occurred based on the identification data recorded in the nonvolatile memory, and updates the contents of the nonvolatile memory based on the data indicating the status of progress of the recording of the input data in accordance with a result of the judgment.

* * * * *